No. 768,489. PATENTED AUG. 23, 1904.
J. C. SMITH.
BRAKE AND AUTOMATIC STOP DEVICE.
APPLICATION FILED MAR. 23, 1904.
NO MODEL. 4 SHEETS—SHEET 1.
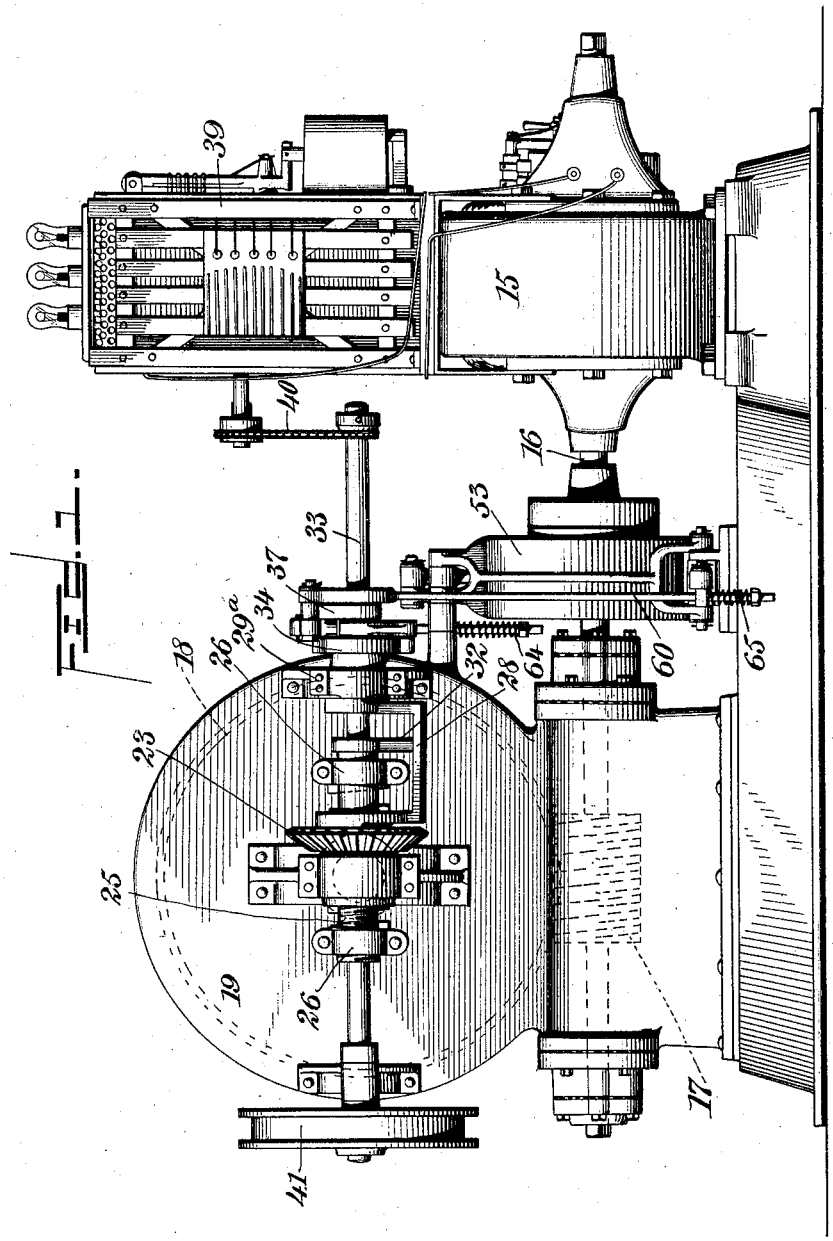
WITNESSES:
INVENTOR
John C. Smith
BY
ATTORNEYS No. 768,489. PATENTED AUG. 23, 1904.
J. C. SMITH.
BRAKE AND AUTOMATIC STOP DEVICE.
APPLICATION FILED MAR. 23, 1904.
NO MODEL. 4 SHEETS—SHEET 2.
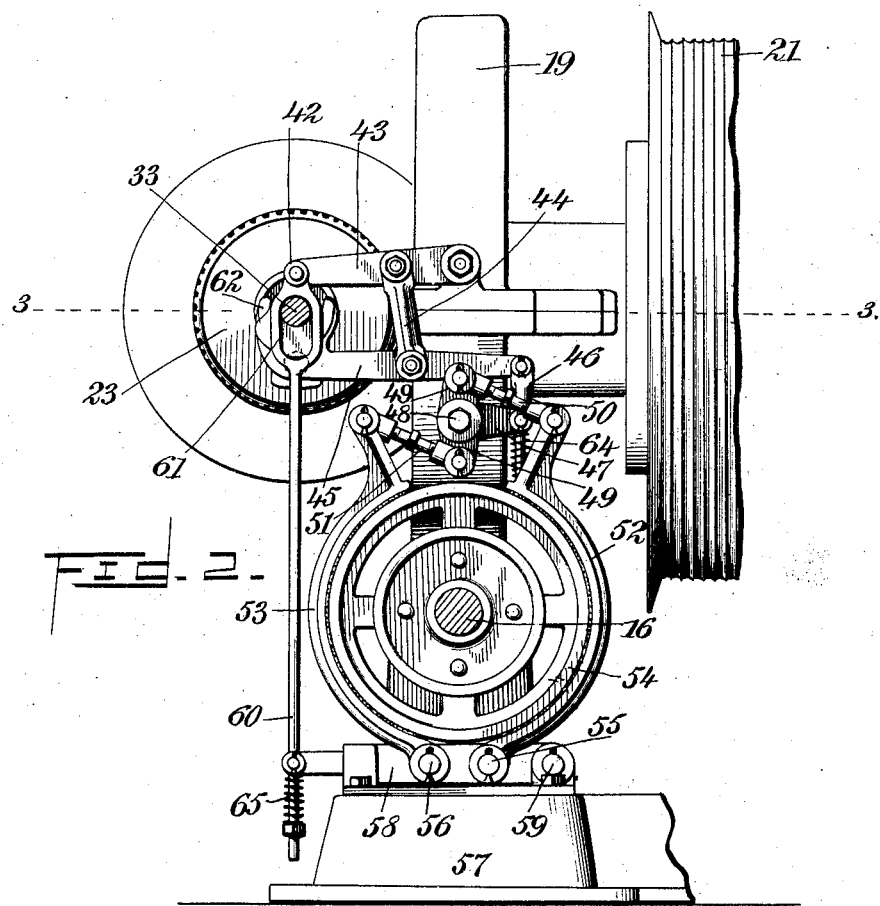
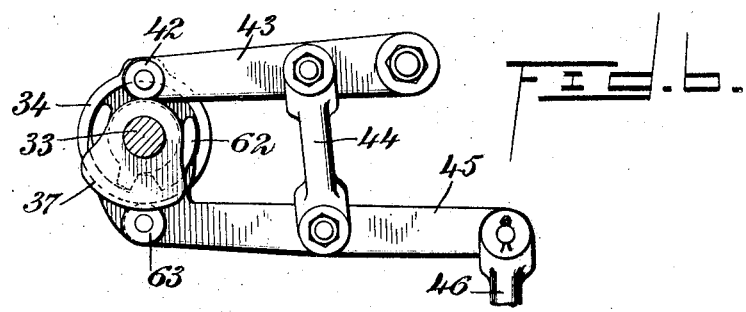
WITNESSES:
INVENTOR
John C. Smith
BY
ATTORNEYS

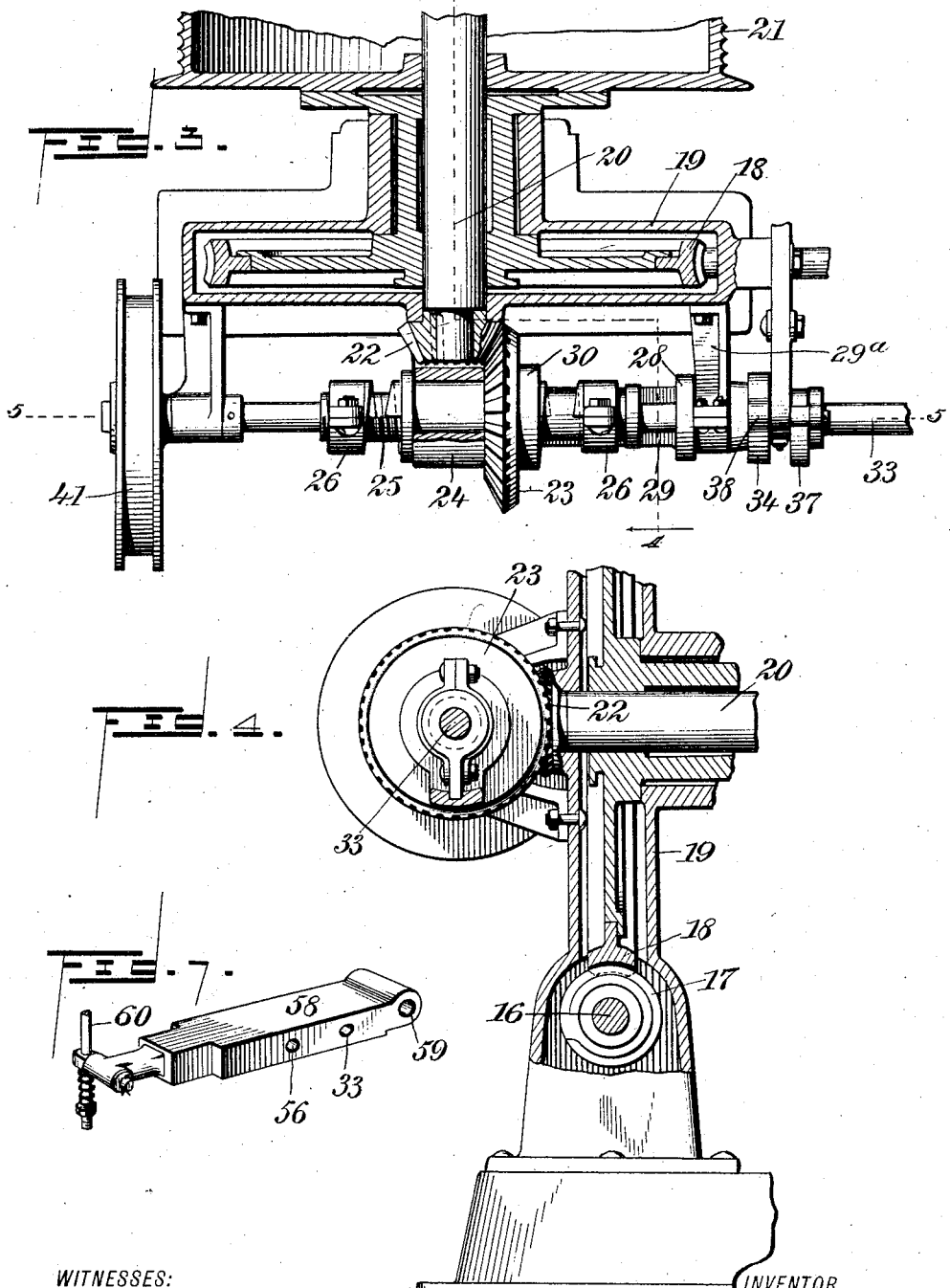

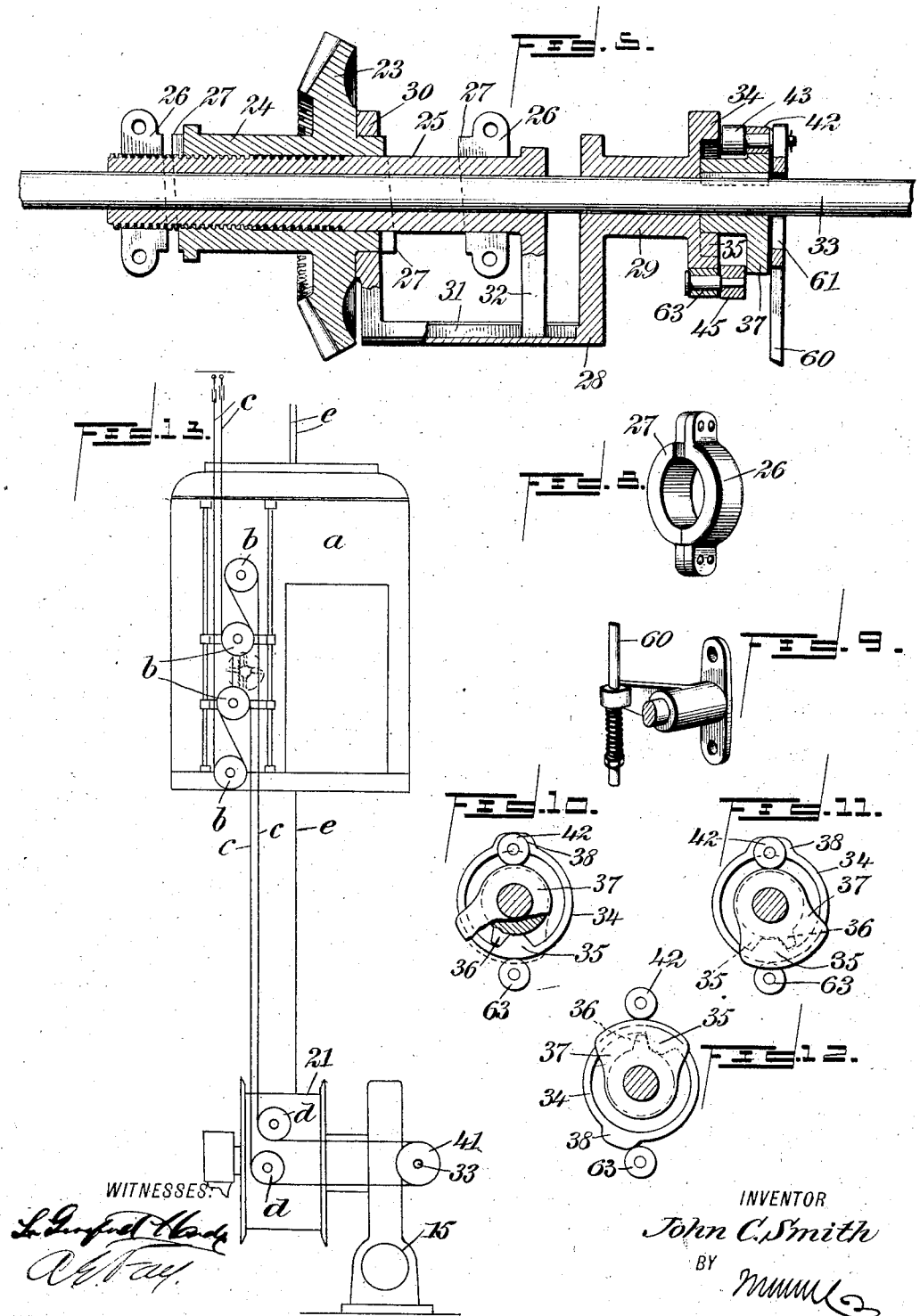

No. 768,489.

Patented August 23, 1904.

UNITED STATES PATENT OFFICE.

JOHN C. SMITH, OF LOUISVILLE, KENTUCKY, ASSIGNOR TO AMERICAN MACHINE COMPANY, OF LOUISVILLE, KENTUCKY, INCORPORATED.

BRAKE AND AUTOMATIC STOP DEVICE.

SPECIFICATION forming part of Letters Patent No. 768,489, dated August 23, 1904.

Application filed March 23, 1904. Serial No. 199,589. (No model.)

*To all whom it may concern:*

Be it known that I, JOHN C. SMITH, a citizen of the United States, and a resident of Louisville, in the county of Jefferson and State of Kentucky, have invented a new and Improved Brake and Automatic Stop Device, of which the following is a full, clear, and exact description.

This invention relates to a combined brake and automatic stop, which is useful in many machines and is especially useful in hoisting-machines, particularly when applied to elevators.

The objects of my invention are to provide means for automatically stopping a machine, elevator, or the like at predetermined limiting-points and at the same time provide means for stopping the same at intermediate points as desired.

Further objects of my invention will appear in the course of the subjoined description.

Reference is to be had to the accompanying drawings, forming a part of this specification, in which similar characters of reference indicate corresponding parts in all the figures.

Figure 1 is a side elevation showing a preferred form of the invention applied to a hoisting-machine used for operating an elevator. Fig. 2 is an end view of the same with the motor removed. Fig. 3 is a longitudinal section on the line 3 3 of Fig. 2. Fig. 4 is a vertical section on the line 4 4 of Fig. 3. Fig. 5 is a sectional view on the line 5 5 of Fig. 3. Fig. 6 is a fragmentary view showing the levers and cams for operating the brakes. Figs. 7, 8, and 9 are perspective views of details. Figs. 10, 11, and 12 are end views of the cams for operating the brake, showing them in different positions; and Fig. 13 is a diagrammatic view showing a way of applying this device to an elevator.

In the drawings, 15 represents a motor of any desired character connected to a shaft 16, which is provided with a worm 17 or other operating device, connected to a gear 18, incased in a casing 19, and through the instrumentality of a shaft 20 operating a winding-drum 21. On the end of the shaft 20 is placed a bevel-pinion 22, meshing with a bevel-gear 23, which is preferably formed integrally with a nut 24. Within the nut 24 is a sleeve 25, which has screw-threaded engagement with the nut, so that the rotation of the nut will cause longitudinal movement of the sleeve in either direction, according to the motion of the nut. Upon the sleeve 25 are secured at any desired points a pair of stop-nuts 26, which are clamped to the sleeve at any desired point for the purpose of stopping the longitudinal motion of the sleeve when they strike the ends of the nut 24. The ends of the nuts 24 and the adjacent ends of the nuts 26 are formed with projections 27, as shown, for the purpose of holding the parts in the desired position when the sleeve 25 travels far enough for these projections to engage with each other.

28 is a revoluble frame provided with an offset part and with two bearing-surfaces 29 and 30, the latter engaging over a shoulder on the nut 24 and acting as a bearing for the nut. On the frame 28 is a guide 31, in which a projection or arm 32 on the sleeve 25 is adapted to reciprocate. This frame and the sleeve 25 are rotatably mounted upon a shaft 33. It will be obvious that the rotation of the nut 24 by the means described will cause the sleeve 25 to travel in either direction, as desired, until the projections 27 come into contact with each other, the projection 32 being guided by means of the guide 31, as set forth. When the projections 27 come into contact, however, the longitudinal motion necessarily stops and the nut 24 carries the whole sleeve 25 around with it and also carries the frame 28 in the same way. The frame 28 is normally held from rotation by the frictional contact of its bearing-surface 29 with a bracket $29^a$ on the casing 19.

Upon the outer end of the frame 28 is a cam 34, the purpose of which will be described later. Also upon this frame is a lug 35, which engages with a lug 36 for the purpose of operating a second cam 37, which is mounted fast upon the shaft 33.

38 is a cam projection upon the cam 34.

39 is a controlling device which through the instrumentality of a chain 40 or equivalent, is operated by rotating or oscillating the shaft 33 and in case the device is applied to an elevator is intended to be operated by hand from the elevator or by the driving mechanism.

41 is a pulley on the shaft 33.

42 is a roller located in such a position as to be moved up and down by the cam 37 and is attached to the end of a pivoted lever 43, which in turn is attached, by means of a pivoted link 44, to a second pivoted lever 45. This lever is shown in the present instance to be connected by a link 46 to a bell-crank 47, pivoted at 48 to the framework of the machine and having oppositely-extending arms 49 connected by adjustable links 50 and 51 to the two brake-bands 52 and 53, which are designed for stopping the machine and are applied to a wheel 54 upon the shaft 16. These brake-bands are pivoted at their lower ends at 55 and 56 to a block 58, which in turn is pivoted at 59 to a base 57. A rod 60 is connected to the block 58 and passes upwardly to the lever 43, to which it is joined at the point of application of the roller 42. This rod 60 is provided with an enlarged portion having a slot 61, through which passes the shaft 33. The lever 45 is provided with projections 62, extending along the shaft at both sides and acting as a guide for the lever 45.

Although definite mechanism has been described, it will be understood that this is merely employed for convenience and that it illustrates the principle of my invention only and that many modifications may be made therein without departing from the scope of my invention as set forth in the claims, and I do not wish to be limited to the exact character of construction shown in the drawings.

The operation of the device is as follows: Power being applied to the shaft 16 by means of the motor, the drum 21 will be operated through the connections described, and upon the rotation of the shaft 20 of this drum the nut 24 will be constantly rotated as long as the drum is in operation. The rotation of the nut 24 will cause longitudinal movement of the sleeve 25 until the projections 27 come into contact, when the sleeve 25 and frame 28 will be rotated, thereby causing the cam 37 to assume the position shown in Fig. 12 and force the roller 42 upward, thereby swinging the lever 43 upon its pivot and by means of the connections shown pulling the brake-bands 52 and 53 toward the circumference of the wheel 54. At the same time the rod 60 will be lifted, thereby lifting the block 58 and the lower pivoted ends of the brake-bands 52 and 53 and providing for an even frictional contact of the brake-bands throughout their entire length. This construction gives the brake-shoes an equal bearing around the surface of the brake-wheel, thereby causing equal wear and friction throughout the length of the brake-shoes. It also gives simultaneous release of the brake-shoes at all points when the brakes are released. In case the brake applied in this manner is not sufficient to cause the stoppage of the machine the continued rotation of the frame 28 with the shaft 33 will cause the cam-surface 38 to come into contact with the roller 63, as shown in Fig. 12, and will force the outer end of the lever 45 downward, and consequently the other end and the link 46 upward to a further extent than was the case when operated on only by the lever 43. This will cause the brakes to be applied with more force and secure the stoppage of the machine. Springs 64 and 65 are employed for the purpose of adjusting the brakes and are used in an obvious manner. In order to relieve the brake, the cam 37 will be caused by the rotation of the shaft 33 to move farther around in the same direction independent of the cam 38, which will remain in its lower position against the roller 63 while the cam 37 is rotating far enough to allow the roller 42 to descend. The cam 37 having a greater throw than the cam-surface 38 allows the brake to be released and the motor to apply power to the machine and cause the cam 37 to revolve in the opposite direction when reversed until the lugs 35 and 36 come into contact, as shown in Fig. 11.

By this construction the rotation of the drum may be stopped at any point, according to the positions at which the stops 26 are set, so that the drum will rotate in one direction in the desired length of time and then will be automatically brought to rest. If then reversed, it will rotate in the other direction until automatically brought to rest by the other stop. At any point intermediate between these two positions the brake may be applied by means of mechanism independent of the automatic stopping device. In the case of an elevator it can be stopped by the rotation of a shipper in the elevator. This shipper-wheel would be connected to the shaft 33 by means of the pulley 41, and upon rotation thereof the cam 37 would be operated in the same manner to apply the brakes.

In Fig. 13 a diagrammatic view is shown, illustrating the method of applying this device to an elevator. In this figure, *a* represents the elevator, and *b* side wheels, over which passes a cord or cable *c*. This cable is directed by idlers *d* to the pulley 41, and the drum 21 operates the elevator by means of a cable *e*.

Having thus described my invention, I claim as new and desire to secure by Letters Patent—

1. The combination with a hoisting-machine, of a brake device comprising a brake, a frame, connections from the frame to the brake comprising a cam on the frame, a second cam capable of being operatively connected to said frame, and a system of levers engaging the said cams, and automatic means connected to said machine for rotating the frame and applying the brake at predetermined times.

2. The combination with a rotary shaft, of a brake device comprising a brake, a frame, connections between said brake and frame comprising a cam on the frame, a second cam, means for operatively connecting said second cam to said frame, and two pivoted levers, one in engagement with each cam, automatic means connected to said shaft for moving said frame and applying said brake, and additional manually-operated means for applying the brake.

3. An automatic brake and stop mechanism, comprising a sleeve, means for longitudinally moving said sleeve, and stop-nuts clamped to said sleeve for arresting the longitudinal motion thereof and causing the sleeve to rotate.

4. An automatic brake and stop mechanism, comprising a threaded sleeve, a nut in screw-threaded engagement therewith and means for rotating the nut.

5. An automatic brake and stop mechanism, comprising an externally-threaded sleeve, a nut for giving longitudinal motion to said sleeve, stops on said sleeve, a frame in connection with a part of said sleeve, a brake, and means in connection with said frame for applying the brake.

6. An automatic brake mechanism comprising a brake, a sleeve, a rotatable member in engagement with said sleeve, stop-nuts clamped to said sleeve and constituting means for arresting the motion of said sleeve, and connections from said sleeve to said brake.

7. An automatic brake and stop mechanism, comprising a longitudinally-movable member, a rotatable member in engagement therewith constituting means for moving said movable member, a rotatably-mounted frame, a guide on said frame, a projection on said movable member in engagement with said guide, a brake, and means for connecting said frame to said brake comprising a cam mounted on said frame, a lever having engagement with said cam, and a system of levers in connection with said lever and said brake.

8. A brake and stop mechanism, comprising a longitudinally-movable member, means for moving said member, means for arresting the motion thereof, means for causing rotation of said member, a rotatably-mounted frame, means on said member for engaging with said frame and transmitting rotary motion thereto, a cam on said frame, a lever in engagement with said cam and a brake in operative connection with said lever.

9. The combination with a machine, of a brake device therefor, comprising a brake, a shaft, a frame on said shaft, connections from said frame to said brake, automatic means connected to said machine for moving said frame and applying the brake, and additional manually-operated means for applying the brake, the last-mentioned means comprising a cam on said shaft.

10. An automatic brake and stop mechanism, comprising a shaft, two cams mounted concentrically with said shaft, a brake, connection between said cams and said brake, and means for rotating one of said cams with respect to the other.

11. A brake and stop mechanism, comprising a frame, a cam supported by said frame, a second cam mounted concentrically with said first-named cam, said frame being movable with respect to said cam and means for rotating said frame at predetermined times.

12. A brake and stop mechanism, comprising a sleeve, means for longitudinally moving said sleeve comprising a rotary member, stops on said sleeve for arresting the motion of said sleeve, a brake, a cam on said sleeve operatively connected to said brake, a shaft, a second cam mounted on said shaft, and means for transmitting motion from said rotary member to one of said cams and thereafter transmitting rotary motion to the other of said cams.

13. A brake and stop mechanism, comprising a rotatable member, a pair of brake-shoes, a pivoted bar to which both of said brake-shoes are pivotally attached, and means attached to said bar for operating the shoes against said rotatable member.

14. An automatic brake and stop mechanism, comprising a brake, a shaft, a plurality of individually-movable cams, means for connecting said cams to said shaft, connections from one of said cams to the said brake, and a connection from the other of said cams to said connections.

15. A brake and stop mechanism, comprising a brake, a shaft, a plurality of cams on said shaft, a plurality of levers, one of said levers being connected to each of said cams, and connections from said levers to said brake.

16. The combination of a brake and stop mechanism, comprising a brake, a movable support therefor, means for operating the brake, a connection between said means and said support, said means comprising a longitudinally-movable member, and a cam connected to said member.

In testimony whereof I have signed my name to this specification in the presence of two subscribing witnesses.

JOHN C. SMITH.

Witnesses:
M. J. ROBERTSON,
V. K. ECKER.